United States Patent
De Gasperi et al.

(10) Patent No.: US 12,497,226 B2
(45) Date of Patent: Dec. 16, 2025

(54) CONNECTOR FOR A FLUID DISPENSER

(71) Applicant: COCKTAILSMACHINE SRL, Lainate (IT)

(72) Inventors: Marco De Gasperi, Lainate (IT); Marcello De Gasperi, Lainate (IT)

(73) Assignee: COCKTAILSMACHINE SRL, Milan (IT)

( * ) Notice: Subject to any disclaimer, the term of this patent is extended or adjusted under 35 U.S.C. 154(b) by 196 days.

(21) Appl. No.: 18/548,588

(22) PCT Filed: Feb. 15, 2022

(86) PCT No.: PCT/IB2022/051332
§ 371 (c)(1),
(2) Date: Sep. 1, 2023

(87) PCT Pub. No.: WO2022/185137
PCT Pub. Date: Sep. 9, 2022

(65) Prior Publication Data
US 2024/0158152 A1   May 16, 2024

(30) Foreign Application Priority Data
Mar. 1, 2021   (IT) .......... 102021000004736

(51) Int. Cl.
*B65D 77/06* (2006.01)
*B67D 3/04* (2006.01)

(52) U.S. Cl.
CPC .......... *B65D 77/067* (2013.01); *B67D 3/043* (2013.01)

(58) Field of Classification Search
CPC .............................. B65D 77/067; B67D 3/043
See application file for complete search history.

(56) References Cited

U.S. PATENT DOCUMENTS 8,196,621 B2 * 6/2012 Johnson .................. F16L 37/40
141/375
8,479,785 B2   7/2013 Johnson
(Continued)

FOREIGN PATENT DOCUMENTS

EP   1627850 A1   2/2006
WO   9015951 A1   12/1990

OTHER PUBLICATIONS

International Serch Report and Written Opinion of the International Searching Authority; Application No. PCT/IB2022/051332; Completed: Apr. 4, 2022; Mailing Date: Apr. 14, 2022; 10 Pages.

*Primary Examiner* — Frederick C Nicolas
(74) *Attorney, Agent, or Firm* — Whitmyer IP Group LLC

(57) ABSTRACT

A connector for dispensing a fluid contained in a bag-in-box container is disclosed, that is usable in an automatic dosing an apparatus of ingredients for cocktails, in which the connector includes an assembly of several portions including a first assembly portion connected to the container and a second assembly portion connectable to a dispensing tube that is in turn connected to a peristaltic pump, the assembly including a first check valve that, when the connector is assembled, is opened by a pin that belongs to the assembly, and a second check valve that is opened during dispensing through the effect of a vacuum caused by the peristaltic pump, so that owing to the second valve the dispensing circuit is kept closed even when the first valve is open.

16 Claims, 7 Drawing Sheets

(56) References Cited

U.S. PATENT DOCUMENTS

| | | | |
|---|---|---|---|
| 10,759,583 B2* | 9/2020 | Johnson | B67D 3/045 |
| 2002/0179875 A1* | 12/2002 | Davis | F16L 37/44 |
| | | | 137/614.04 |
| 2004/0256424 A1* | 12/2004 | Johnson | F16L 37/32 |
| | | | 222/518 |

* cited by examiner

CONNECTOR FOR A FLUID DISPENSER

BACKGROUND OF THE INVENTION

The invention relates to a connector for a fluid dispenser, in particular a connector set up for connection to a fluid tank, like for example connection to a container of the bag-in-box type.

Specifically but not exclusively, the invention can be applied in the context of an ingredient dosing apparatus for preparing cocktails, although it can be applied to dose other types of ingredient, both food and non-food ingredients.

As known, a bag-in-box container comprises a bag that contains a hermetically sealed liquid that is positioned inside a box made of stiff material. In general, the box is made of a suitable cap and/or tap.

Containers of the bag-in-box type are also known that are provided with a suitable connection intended for coupling with a connector that comprises a valve that is opened by a pin arranged on the connection, so that the valve, when fitted to the connection of the bag-in-box container, is opened by the pin.

The prior art comprises, for example, patent publication EP 1627850 A1 that shows a dispensing tap of the "bag-in-box" type with a connector provided with a check valve pushed by elastic means.

Prior-art connectors for bag-in-box containers nevertheless have some limits and drawbacks and are subject to improvements.

Firstly, the substances present in the bag-in-box container come into contact with the air present inside the valve, with resulting risk of damage to the liquid, through oxidation and/or contamination.

Further, prior-art connectors are hardly practical to clean, above all because of the presence of a spring that, in general, is arranged to maintain the shutter disc of the valve in the closed position.

SUMMARY

One object of the invention is to provide a connector that is able to remedy one or more of the aforesaid limits and drawbacks.

One object of the invention is to make a connector for a fluid dispenser that is an alternative to those of the prior art.

One object of the invention is to provide a connector for a fluid dispenser suitable for being used in a dosing apparatus, in particular a dosing apparatus for preparing cocktails. One object of the invention is to provide a method for preparing a mixture using an ingredient dosing apparatus with the connector.

One advantage is to obtain a connector that is suitable for connecting a container, which contains the fluid to be dispensed, to a pump that is suitable for dispensing the fluid, in particular a connector that is suitable for a container of the bag-in-box.

One advantage is to ensure the integrity of the liquid present in the container, in particular by avoiding contact of the liquid with the air, thus reducing the risk of damage of the liquid through the effect of oxidation and/or contamination.

One advantage is to make available a connector that is easy and practical to clean, in particular a connector devoid of elastic means set up to close a shutter controlling the flowrate.

One advantage is to devise a connector that is constructionally simple and cheap for dispensing a fluid from a container.

Such objects and advantages, and still others, are achieved by a connector according to one or more of the claims set out below.

In one embodiment, a connector that is suitable for dispensing a fluid contained in a container, for example a bag-in-box container, comprises an assembly of several portions that includes a first portion connectable to the container and a second portion connectable to a dispensing tube that is in turn connectable to a peristaltic pump, said assembly comprising a first valve that, when the connector is assembled, is opened by a pin carried by a portion of the assembly, and a second valve that is opened during dispensing through the effect of a vacuum caused by the peristaltic pump, so that, owing to the second valve, the dispensing circuit can be maintained closed even when the first valve is open.

BRIEF DESCRIPTION OF THE DRAWINGS

The invention can be better understood and implemented with reference to the attached drawings that illustrate a non-limiting embodiment thereof, in which.

DETAILED DESCRIPTION

Figure 1:
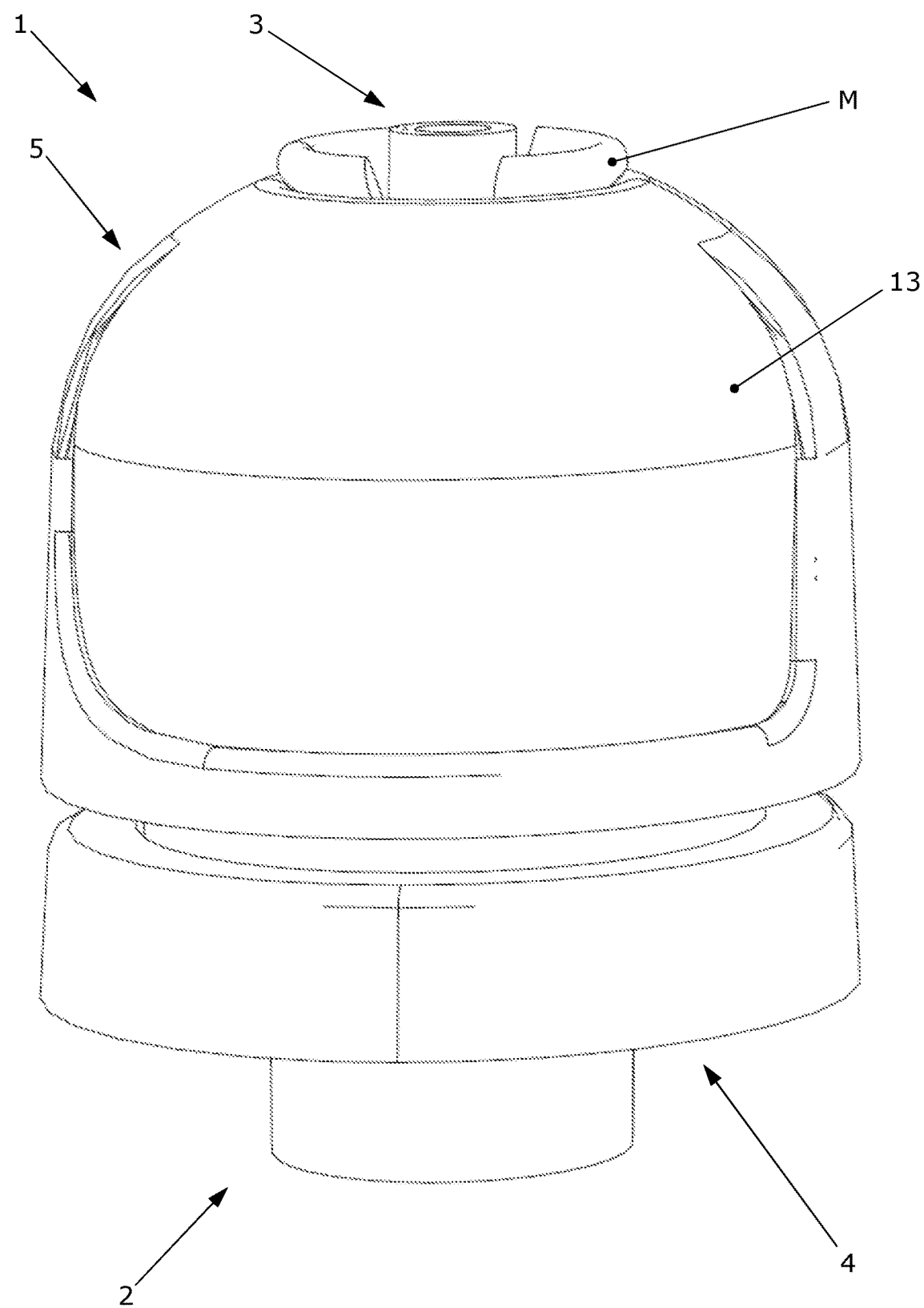
FIG. 1 is a perspective view of an embodiment of a connector made according to the present invention.
Figure 2:
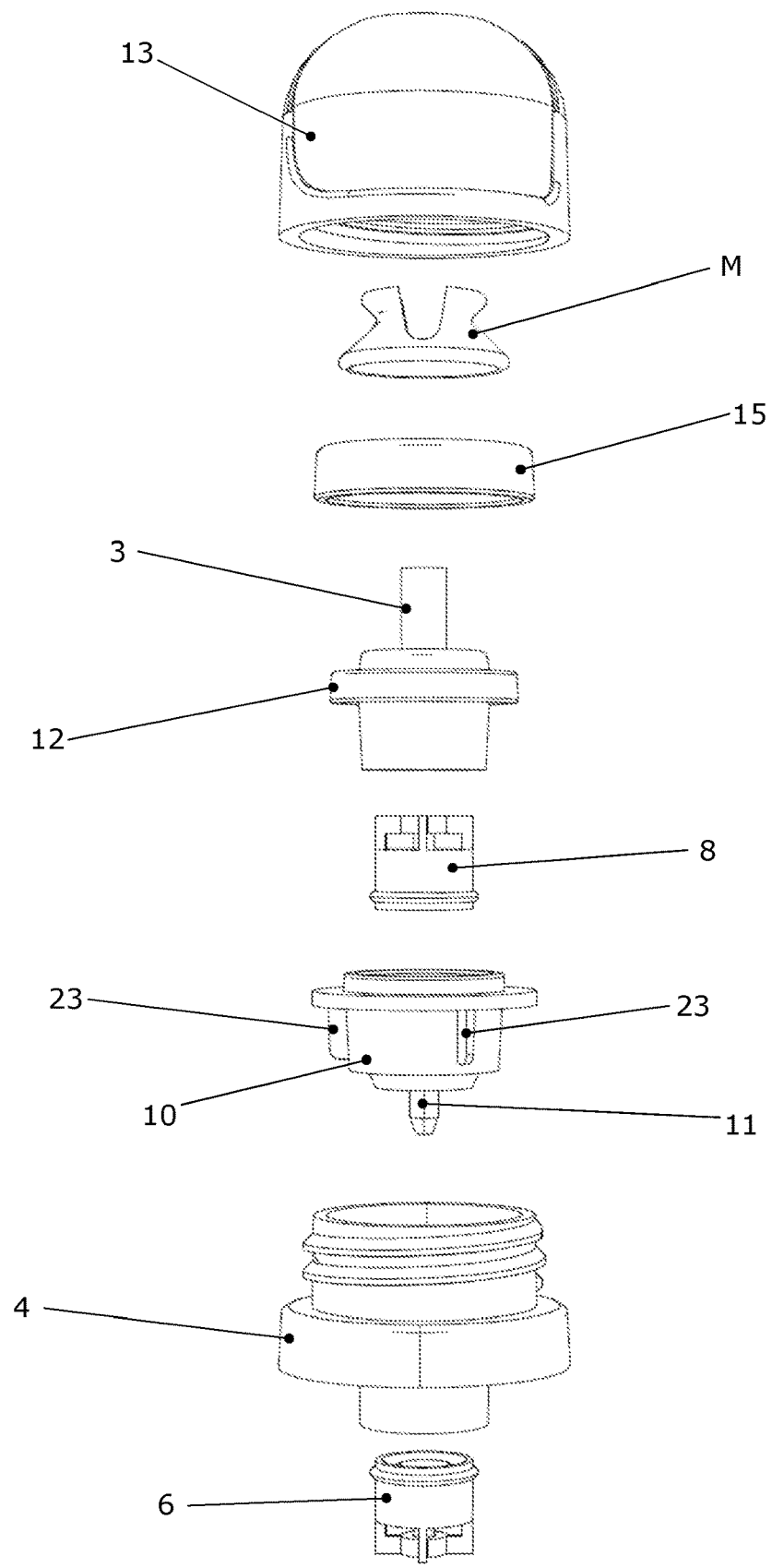
FIG. 2 is an exploded view of the connector of FIG. 1.

With reference to the aforesaid figures, overall with 1, a connector for a fluid dispenser has been indicated, which is suitable in particular for dispensing a fluid contained in a bag-in-box container, for example that is usable in an automatic cocktail ingredient dosing apparatus.

The connector 1 may comprise, in particular, an assembly with a first end 2 and a second end 3. The first end 2 may be, in particular, a tubular end. The second end 3 may be, in particular, a tubular end. The assembly defines a fluid passage with a flow that from the first end 2 is directed to the second end 3.

The first end 2 may be, in particular, configured for connection to a fluid tank, like, for example, for connection to a container of the bag-in-box type (for example of known type and not shown), in particular for a connection of non-removable type (removable only by destroying the container, so as to devise a temper-proof device against the risk of tampering) with the flexible part (bag) of the bag-in-box container. In the attached figures, an embodiment is shown of the first end 2 that is particularly suitable for connection with a bag-in-box container or with a connection set up on the bag-in-box container.

The second tubular end 3 may be, in particular, configured for connection to a fluid dispensing tube (for example of known type). The connection between the second tubular end 3 and the fluid dispensing tube may comprise, in particular, a connection of stable and non-removable type (removable only by destroying the tube or the second end), so as to devise a tamperproof device against the risk of tampering.

The assembly may comprise, in particular, a first assembly portion 4 that comprises the aforesaid (tubular) first end 2. The first assembly portion 4 may comprise, in particular, a portion connected to the container (to a flexible part or bag, of the bag-in-box container, containing the fluid to be dispensed), stably and not removably, so that the set formed by the container and by the first portion attached to the container is substantially a set of the disposable type. The connection of the first assembly portion 4 to the container may comprise, in particular, a hermetic connection.

The assembly may comprise, in particular, a second assembly portion 5 that comprises the aforesaid (tubular) second end 3.

The assembly may comprise, in particular, a first valve 6 arranged on the first portion 4. The first valve 6 may comprise, in particular, a check valve. The first valve 6 may be, in particular, configured with an opening movement to the first end 2.

The first valve 6 may comprise, in particular, a shutter 7, for example an axially movable shutter. The shutter 7 may comprise, in particular, a disc portion and a stem portion. The first valve 6 may comprise, in particular, an annular washer arranged on the disc portion of the shutter 7. The first valve 6 may comprise, in particular, a base body that contains the shutter 7. The base body of the first valve 6 may comprise, in particular, a liner portion and a guide portion.

The stem portion of the shutter 7 may be, in particular, slidingly coupled with the guide portion of the base body. In particular, the stem portion may be slidable within a hole obtained on the guide portion. The disc portion of the shutter 7 may be, in particular, slidingly coupled with an inner surface of the liner portion of the base body, with a hermetic coupling, for example owing to the annular washer.

The inner surface of the liner portion may comprise, in particular, a shutter seat against which the shutter 7 abuts in a closed position. The shutter 7 is configured so as to have an opening movement directed towards the first end 2. The outer surface of the liner portion of the base body may comprise, in particular, a washer seat for housing an annular washer configured to make a seal in a housing seat of the valve obtained on the first portion 4, as will be explained better below.

The base body may comprise, in particular, one or more passage openings of the fluid arranged between the liner portion and the guide portion.

The assembly may comprise, in particular, a second valve 8 arranged between the first valve 6 and the second end 3. The second valve 8 may comprise, in particular, a check valve. The second valve 8 may be, in particular, so configured as to have an opening movement directed to the second end 3 and a closing movement in an opposite direction.

The second valve 8 may comprise, in particular, a shutter 9, for example an axially movable shutter. The shutter 9 may comprise, in particular, a disc portion and a stem portion. The second valve 8 may comprise, in particular, an annular washer arranged on the disc portion of the shutter 9. The second valve 8 may comprise, in particular, a base body that contains the shutter 9. The base body of the second valve 8 may comprise, in particular, a liner portion and a guide portion.

The stem portion of the shutter 9 may be, in particular, slidingly coupled with the guide portion of the base body. In particular, the stem portion may be slidable within a hole obtained on the guide portion. The disc portion of the shutter 9 may be, in particular, slidingly coupled with an inner surface of the liner portion of the base body, with a hermetic coupling, for example owing to the annular washer.

The inner surface of the liner portion may comprise, in particular, a shutter seat against which the shutter 9 abuts in a closed position. The shutter 9 is configured so as to have an opening movement directed towards the second end. The outer surface of the liner portion of the base body of the second valve 8 may comprise, in particular, a washer seat for housing an annular washer configured to make a seal in a housing seat of the second valve 8 obtained on the second portion 5, as will be explained better below. The base body of the second valve 8 may comprise, in particular, one or more passage openings of the fluid arranged between the liner portion and the guide portion.

The opening movement of the first valve 6 may be, in particular, in the opposite direction to the opening movement of the second valve 8.

The assembly may comprise, in particular, a third portion 10 arranged between the first portion 4 and the second portion 5.

Figure 3:
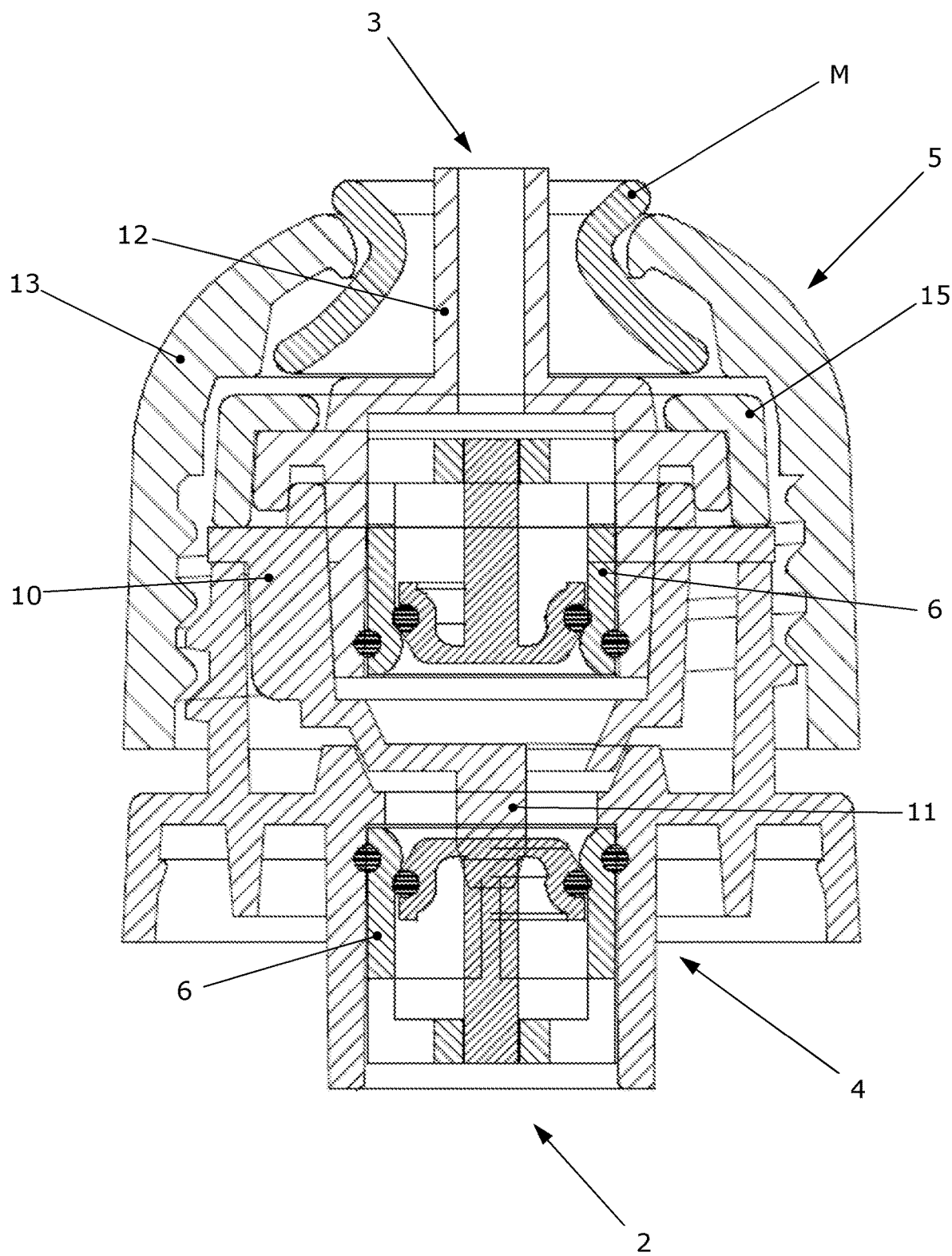
FIG. 3 is a longitudinal section of the connector of FIG. 1.
Figure 4:
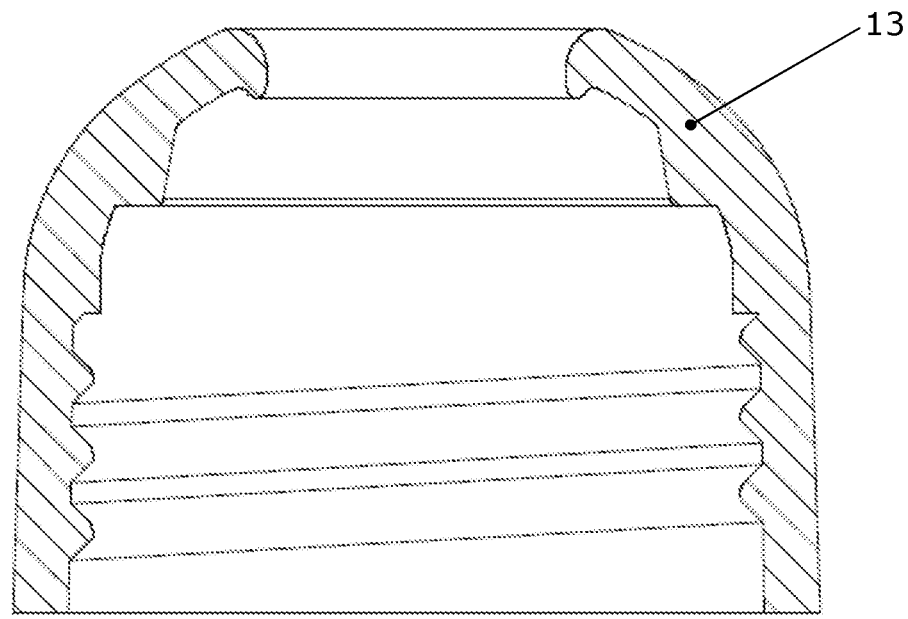
FIGS. 4 to 6 show the sections of the single components that, once assembled, form the connector of FIG. 1.
Figure 4:
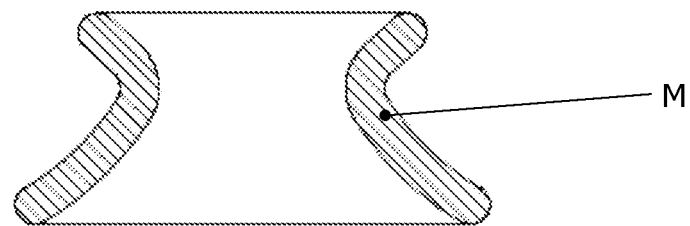
Figure 4:
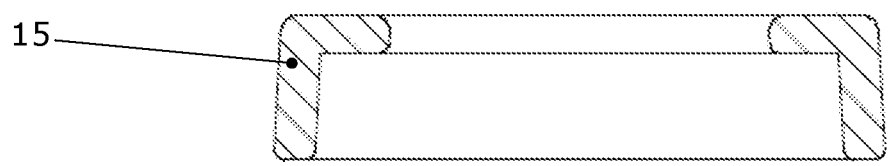
Figure 5:
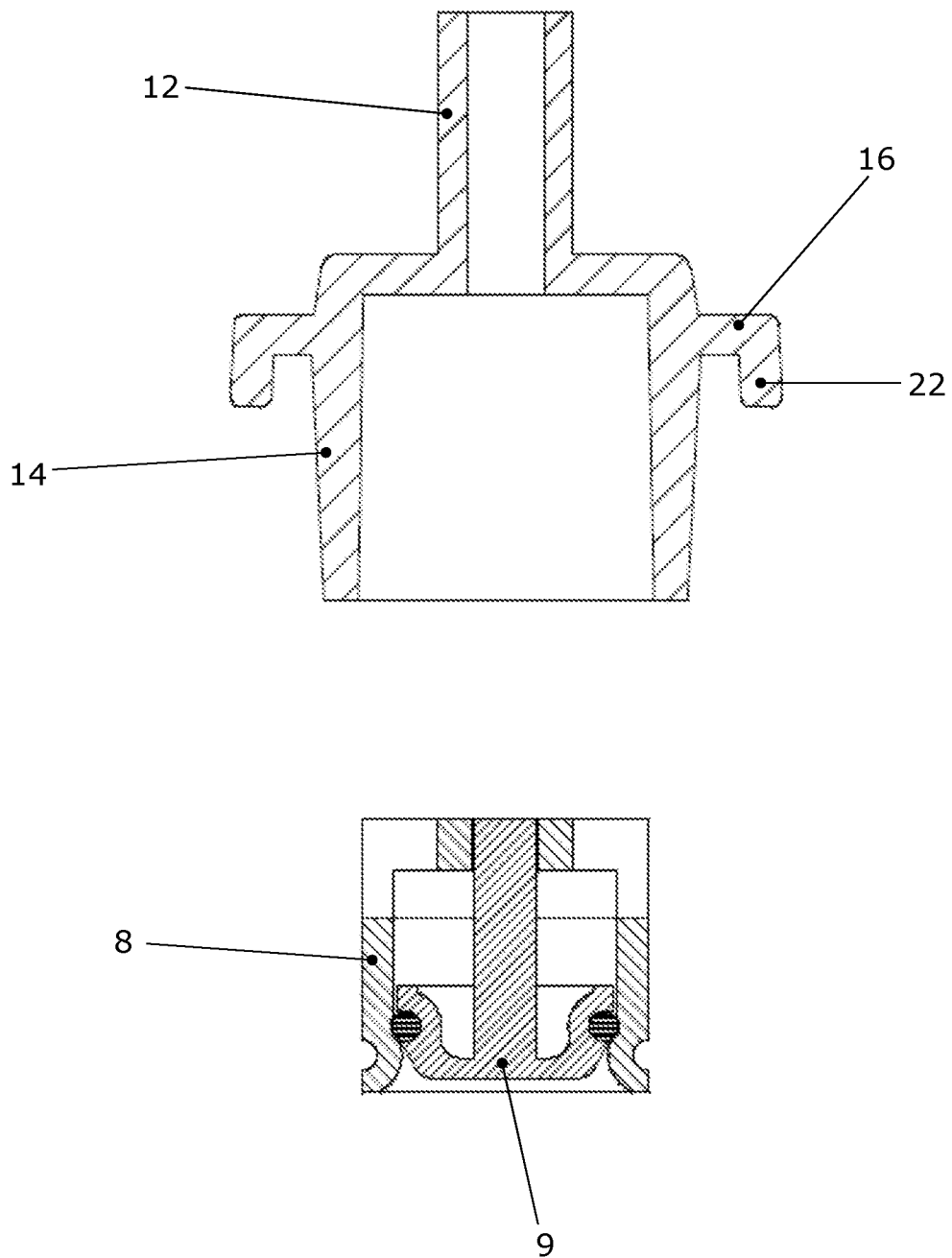
Figure 6:
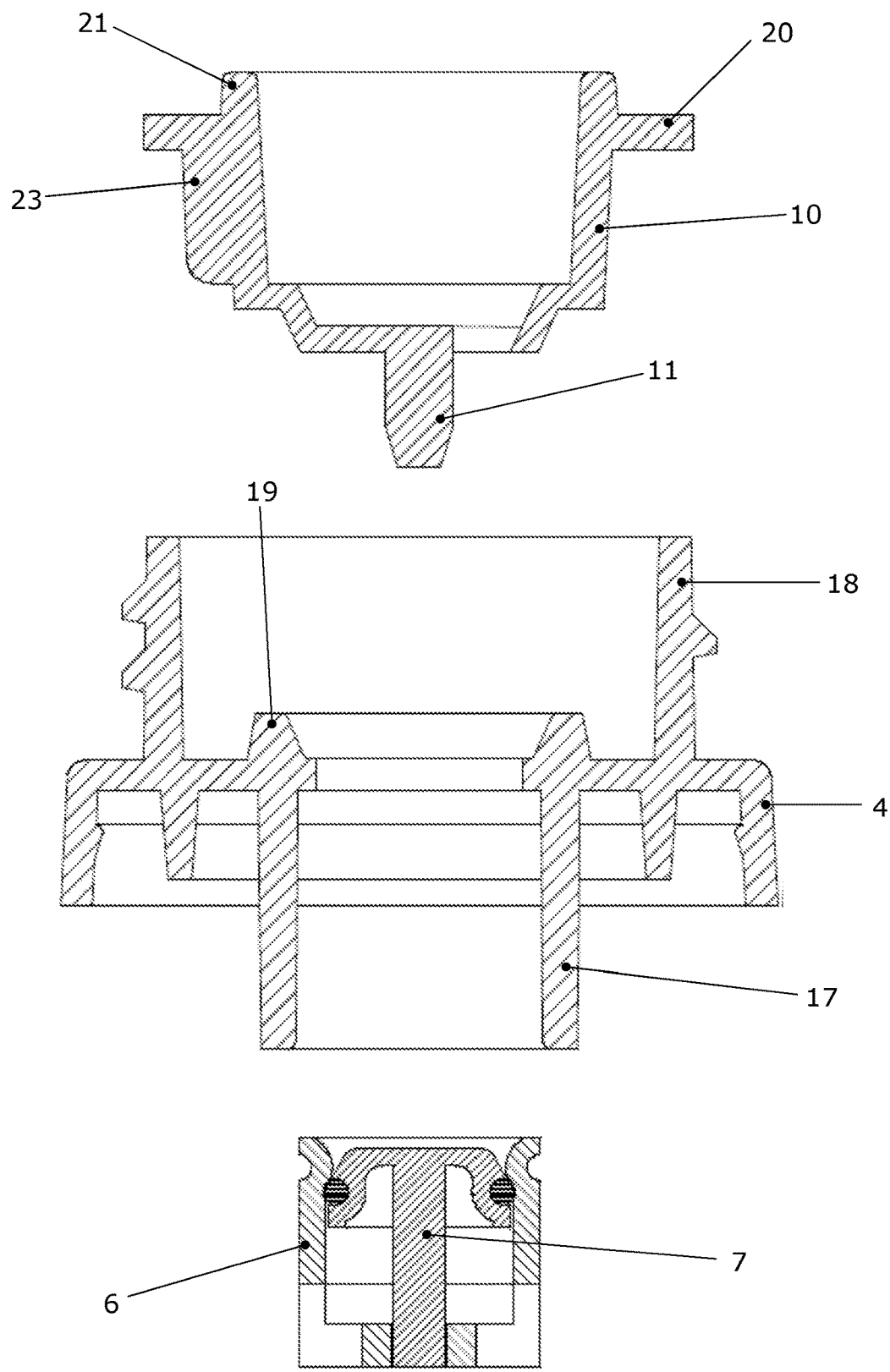

The third portion 10 may comprise, in particular, a pin 11 protruding to the tubular first end 2. It is possible to provide, in an assembled configuration of the aforesaid assembly (see FIGS. 1 and 3), for the pin 11 to interact with the first valve 6, for example with a thrust action against the shutter 7, to take the first valve 6 to an open position.

The second portion 5 may comprise, in particular, a hose holder 12 element. The second portion 5 may comprise, in particular, a tube locking device operationally associated with the hose holder 12 element.

The tube locking device may comprise, in particular, a cap 13 connected to the first portion 4 by a coupling. The cap-first portion coupling may comprise, in particular, a screw coupling. The tube locking device may comprise, in particular, a tube-locking spring M configured to cooperate with the cap 13 in order to lock an end of the dispensing tube on the second end 3 of the hose holder 12 element, so that the end of the dispensing tube remains gripped between the tube-locking spring M and the second end 3 so as to make a fluid hermetic coupling.

The hose holder 12 element may comprise, in particular, on a first side of the hose holder element, the second end 3. The second (for example tubular) end 3 arranged on the hose holder 12 element may be, in particular, a male end. The hose holder 12 element may comprise, in particular, on a second side of the hose holder element opposite the first side, a tubular wall 14 that defines inside a valve seat arranged to house the second valve 8.

The tubular wall 14 may comprise, in particular, a tapered lateral surface, in particular an external lateral surface, coupled with a tapered lateral surface, in particular an internal lateral surface, of the third portion 10. In particular, the third portion 10 may comprise a cup body that contains, wholly or partially, the tubular wall 14. The aforesaid tapered lateral surface of the third portion 10 may be arranged, in particular, on an inner side of the aforesaid cup body.

The second portion 5 may comprise, in particular, a fastening ring 15, or lock ring, arranged in axial contact, on a first side of the fastening ring, with the cap 13, in which axial refers to an axis of the cap-first portion coupling.

The fastening ring 15 may be, in particular, arranged in axial contact, on a second side of the fastening ring opposite the first side, with a flanged portion 16 that protrudes radially to the outside of the hose holder 12 element, in which radially refers to an axis of the aforesaid cap-first portion coupling.

The second portion 5 may be configured, in particular, such that the dispensing tube is fixed to the second end 3 stably and not removably, without breaking or cutting the tube itself, so as to devise a tamperproof device against the risk of tampering.

The first portion 4 may comprise, in particular, on a first side of the first portion, a tubular wall 17 that defines inside a valve seat arranged to house the first valve 6. The first portion 4 may comprise, in particular, on a second side of the first portion opposite the first side, a tubular body 18. The cap-first portion coupling (which in this specific embodiment is a screw coupling) may be, in particular, arranged between an external lateral surface of the tubular body 18 and an internal lateral surface of the cap 13. The tubular body 18 may be formed and arranged, in particular, to contain, totally or partially, the cup body of the third portion 10.

The first portion 4 may comprise, in particular, on the second side of the first portion, an annular protrusion 19 that comprises a tapered lateral surface, in particular an internal lateral surface, coupled with a tapered lateral surface, in particular an external lateral surface, of the third portion 10.

The third portion 10 may comprise, in particular, a flange 20 protruding radially outwards, in which radially refers to the axis of the cap-first portion coupling.

The flange 20 may be, in particular, arranged in an axial contact, on one side of the flange 20, with an end of the tubular body 18 and, on the opposite side of the flange 20, with the second portion 5. The flange 20 may be, in particular, arranged in an axial contact con the fastening ring 15 of the second portion 5.

The third portion 10 may comprise, in particular, an annular projection 21 protruding axially to the second end 3 of the connector 1, in which axially refers to the axis of the cap-first portion coupling.

The annular projection 21 may be, in particular, at least partially inserted with a coupling lodged inside an annular groove obtained on the hose holder 12 element. The annular groove may be, in particular, open to the first end 2 of the connector and may be, in particular, obtained between the tubular wall 14 of the hose holder element and an annular edge 22 of the hose holder element arranged radially outwards with respect to the tubular wall 14.

The third portion 10 may comprise, in particular, a plurality of ribs 23, for example protruding radially externally and extending axially. The ribs 23, for example three in number, are arranged spaced angularly apart from one another. The ribs 23 may, in particular, protrude from an external lateral surface of the cup body of the third portion 10. The ribs 23 may be formed and arranged, in particular, to facilitate centring of the cup body of the third portion 10 inside the tubular body 18 of the first portion 4.

In use, in the assembled configuration of the assembly, the first valve 6 is kept open by the pin 11, through the effect of the thrust of the pin 11 on the shutter 7 of the first valve 6. The second valve 8 is normally closed and will be opened through the effect of a vacuum generated by the dispensing pump connected to the dispensing tube applied to the second end 3 of the connector.

The first valve 6 (check valve) is a valve arranged in the connector 1 on the side facing the tank of the fluid to be dispensed, i.e., according to the specific non-limiting embodiment illustrated here, to the side of the bag-in-box container. The first valve 6 substantially enables the container (bag-in-box) to be opened when the assembled connector 1 is applied to the container.

The second valve 8 (check valve) is a valve arranged in the connector 1 on the side facing the fluid dispensing zone (in practice, facing the dispensing tube coupled with the dispensing pump), so that the second valve 8 is arranged downstream of the first valve 6, in which "downstream" refers to the direction of the flow of the dispensed liquid. The second valve 8 is in substance, connected to the side of the dispensing pump (peristaltic pump) and is configured so as to open when the pump is driven, through the effect of the vacuum generated by the pump.

The presence of two valves arranged serially in the liquid dispensing circuit enables the contact of the liquid with the air to be reduced considerably. It is noted, in particular, that the dispensing circuit remains closed, at least when the dispensing pump is not active, even when the first valve 6 is opened.

It is observed that the first valve 6 is normally closed when the first portion 4 of the connector 1 is fitted to the bag-in-box container. The first valve 4 is opened through the effect of the action of the thrust pin 11 arranged on the third portion 10 of the connector, when, during the assembly step, the second portion 5 is coupled with the first portion 4 with the third portion 10 interposed between the first portion 4 and the second portion 5, in particular when the cap 13 of the second portion 5 is screwed to the thread set up on the first portion 4.

It is also observed that it is not necessary to use any valve provided with a spring or other elastic means that operates on the shutter. It is in fact possible, as in the illustrated embodiment, to use two check valves without springs, for example of the type with a disc shutter or other type of shutter (easily washable and reusable). It is anyway possible to use check valves provided with a spring.

Figure 7:
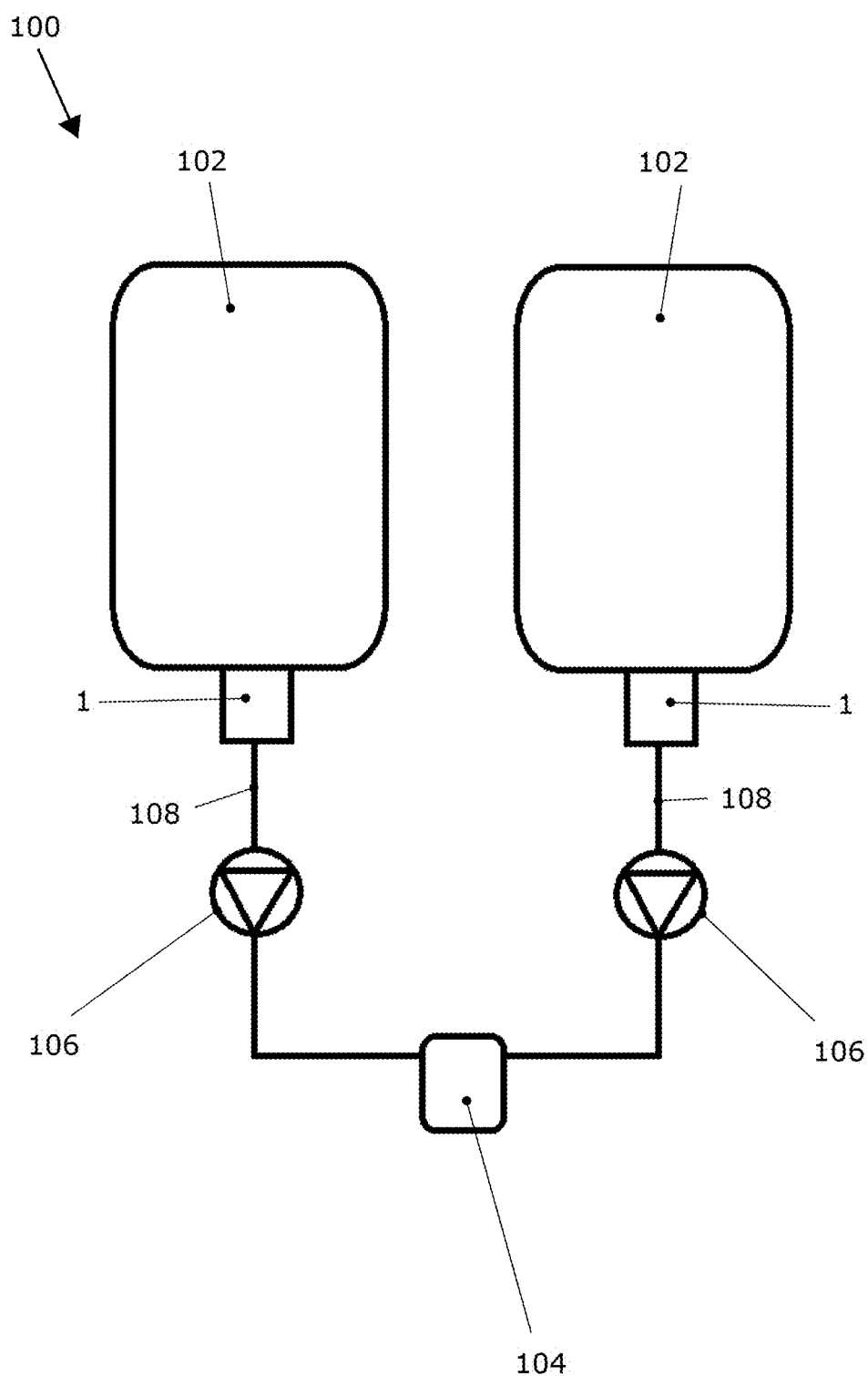
FIG. 7 shows an ingredient dosing apparatus according to the present invention.

The connector 1 may be used, in particular, in a dosing apparatus 100 (that is illustrated in FIG. 7) of ingredients, for example for cocktails. The dosing apparatus 100 may comprise, in particular, two or more containers 102 each of which contains at least one ingredient (for example of the cocktail). It is possible to provide, for example, for the dosing apparatus to comprise two or more containers (for example bottles) to contain a first type of ingredient (for example alcoholic ingredients for cocktails), and two or more hermetic airtight vacuum containers are empty (for example of the bag-in-box type) to contain a second type of ingredient (for example non-alcoholic).

The dosing apparatus 100 may comprise, in particular, at least one dispensing unit 104 (for example comprising a single tap) connected to the aforesaid containers 102 to dispense ingredients (for example that form the cocktail). The dosing apparatus may be used, in particular, for preparing dosed mixtures (cocktails) by dispensing, at the same time as the dispensing unit 104 connected to all the containers 102, the various ingredients (for example alcoholic and/or non alcoholic) that give rise to the selected mixture (cocktail).

The dosing apparatus may comprise, in particular, for each of the aforesaid containers 102, at least one dispensing pump 106 for generating a flow of ingredient from the respective container to the dispensing unit 104. The dispensing pump 106 may comprise, in particular a pump of peristaltic type.

At least one of the aforesaid containers 102 of the dosing apparatus 100 (in particular a bag-in-box container) may be provided with the connector 1 disclosed above to connect the container 102 to the respective dispensing pump 106. The connector 1 includes the assembly with the first end configured for connection to the fluid reservoir 102 and the second end configured for connection to a fluid dispensing tube 108.

It is possible to so set up the first portion 4 that it is attached (hermetically) to a flexible part (bag) of the bag-in-box container 102. The remaining portions of the assembly (in particular the second portion 5 and the third portion 10) may be assembled on the first portion 4 already attached to the container.

The mixture (cocktail) may be prepared by the dosing apparatus in particular automatically. For this purpose, the apparatus may comprise, in particular, programmable electronic controller for controlling the various dispensing pumps on the basis of recipes that are selectable by an operator. The apparatus may comprise, in particular, a user interface by means of which it is possible to select the desired recipe. The user interface may comprise, for example, the user interface of an electronic device, like for example a tablet or the like, which can also include the aforesaid programmable electronic controller together with the computer programming instructions that are suitable for automatic operation of the dosing apparatus.

The invention claimed is:

1. A connector for a fluid dispenser, comprising an assembly with a first end configured for connection to a fluid container and a second end configured for connection to a fluid dispensing tube, said assembly defining a fluid passage from said first end to said second end, said assembly including:
   a first portion which includes said first end and a second portion which includes said second end;
   a first check valve configured with an opening movement towards said first end;
   a second check valve arranged between said first valve and said second end and configured with an opening movement towards said second end;
   a third portion arranged between said first portion and said second portion, said third portion having a pin projecting towards said first end, whereby, in an assembled configuration of said assembly, said pin interacts with said first valve to take said first valve into an open position.

2. The connector according to claim 1, wherein said second portion comprises a hose holder and a hose locking device operatively associated with said hose holder, said hose locking device including a cap connected with said first portion by means of a cap-first portion coupling, said hose holder including, on a first side, said second end and, on a second side opposite to said first side, a tubular wall which defines internally a valve seat arranged to house said second valve, said tubular wall having a tapered lateral surface, coupled with a tapered lateral surface of said third portion.

3. The connector according to claim 2, wherein said second portion comprises a fastening ring arranged in axial contact, on a first side of said fastening ring, with said cap and, on a second side of said fastening ring opposite to said first side, with a flanged portion which protrudes radially from said hose holder, where radially is intended with reference to an axis of said cap-first portion coupling.

4. The connector according to claim 2, wherein said cap-first portion coupling comprises a screw coupling.

5. The connector according to claim 2, wherein said first portion comprises, on a first side, a tubular wall which defines internally a valve seat arranged to house said first valve, and, on a second side opposite to said first side, a tubular body, said cap-first portion coupling being arranged between an external lateral surface of said tubular body and an internal lateral surface of said cap.

6. The connector according to claim 5, wherein said first portion comprises, on said second side, an annular protrusion which includes a tapered lateral surface, coupled with a tapered lateral surface, of said third portion.

7. The connector according to claim 2, wherein said third portion comprises a flange projecting radially outwards, where radially is intended with reference to an axis of said cap-first portion coupling, said flange being arranged in axial contact, on a first side of said flange, with one end of said tubular body and, on a second side of said flange opposite said first side, a fastening ring of said second portion.

8. The connector according to claim 2, wherein said third portion comprises an annular projection projecting axially towards said second end, where axially is intended with reference to an axis of said cap-first portion coupling, said annular projection being at least partially inserted with an interlocking coupling inside an annular recess made on said hose holder; said annular recess being formed, between said tubular wall of said hose holder and an annular edge of said hose holder arranged radially more externally than said tubular wall.

9. The connector according to claim 2, wherein said tapered lateral surface of said tubular wall is an external surface, said tapered lateral surface of said third portion is an internal surface, and said second end on said hose holder is a male end.

10. The connector according to claim 3, wherein said cap-first portion coupling comprises a screw coupling.

11. The connector according to claim 3, wherein said first portion comprises, on a first side, a tubular wall which defines internally a valve seat arranged to house said first valve, and, on a second side opposite to said first side, a tubular body, said cap-first portion coupling being arranged between an external lateral surface of said tubular body and an internal lateral surface of said cap.

12. The connector according to claim 3, wherein said third portion comprises a flange projecting radially outwards, where radially is intended with reference to an axis of said cap-first portion coupling, said flange being arranged in axial contact, on a first side of said flange, with one end of said tubular body and, on a second side of said flange opposite said first side, a fastening ring of said second portion.

13. The connector according to claim 3, wherein said third portion comprises an annular projection projecting axially towards said second end, where axially is intended with reference to an axis of said cap-first portion coupling, said annular projection being at least partially inserted with an interlocking coupling inside an annular recess made on said hose holder; said annular recess being formed, between said tubular wall of said hose holder and an annular edge of said hose holder arranged radially more externally than said tubular wall.

14. A combination of a container with a connector for a fluid dispenser, the combination comprising an assembly with a first end configured for connection to a fluid container and a second end configured for connection to a fluid dispensing tube, said assembly defining a fluid passage from said first end to said second end, said assembly including:
   a first portion which includes said first end and a second portion which includes said second end;
   a first check valve configured with an opening movement towards said first end;
   a second check valve arranged between said first valve and said second end and configured with an opening movement towards said second end;
   a third portion arranged between said first portion and said second portion, said third portion having a pin projecting towards said first end, whereby, in an assembled configuration of said assembly, said pin interacts with said first valve to take said first valve into an open position, wherein said first portion is fluid-tight attached to the container containing a fluid to be dispensed.

15. An ingredient dosing apparatus, comprising:
two or more containers each containing at least one ingredient;
at least one dispensing unit connected to said two or more containers to dispense the ingredients so as to form a mixture;
for each of said two or more containers, at least one dispensing pump to generate an ingredient flow from the respective container towards said at least one dispensing unit;
characterized in that at least one of said two or more containers is provided with a connector to connect said at least one of said two or more containers to the respective dispensing pump, the connector including an assembly with a first end configured for connection to a fluid container and a second end configured for connection to a fluid dispensing tube, said assembly defining a fluid passage from said first end to said second end, said assembly including:
a first portion which includes said first end and a second portion which includes said second end;
a first check valve configured with an opening movement towards said first end;
a second check valve arranged between said first valve and said second end and configured with an opening movement towards said second end;
a third portion arranged between said first portion and said second portion, said third portion having a pin projecting towards said first end, whereby, in an assembled configuration of said assembly, said pin interacts with said first valve to take said first valve into an open position.

16. A method for preparing a mixture using an ingredient dosing apparatus having:
two or more containers each containing at least one ingredient;
at least one dispensing unit connected to said two or more containers to dispense the ingredients so as to form a mixture;
for each of said two or more containers, at least one dispensing pump to generate an ingredient flow from the respective container towards said at least one dispensing unit;
characterized in that at least one of said two or more containers is provided with a connector to connect said at least one of said two or more containers to the respective dispensing pump, the connector including an assembly with a first end configured for connection to a fluid container and a second end configured for connection to a fluid dispensing tube, said assembly defining a fluid passage from said first end to said second end, said assembly including:
a first portion which includes said first end and a second portion which includes said second end;
a first check valve configured with an opening movement towards said first end;
a second check valve arranged between said first valve and said second end and configured with an opening movement towards said second end;
a third portion arranged between said first portion and said second portion, said third portion having a pin projecting towards said first end, whereby, in an assembled configuration of said assembly, said pin interacts with said first valve to take said first valve into an open position,
the method comprising holding open said first valve by said pin in said assembled configuration of said assembly, and opening said second valve due to a vacuum generated by the respective dispensing pump.

* * * * *